といったPatent Office 3,816,433
Patented June 11, 1974

3,816,433
4-FLUORO - γ - (4-METHYLPIPERIDINO)-BUTYRO-
PHENONE AND ITS PHARMACEUTICALLY
ACCEPTABLE SALTS
Sven Erik Harry Hernestam and Nils Olov Bruno Sterner,
Malmo, Sweden, and Jorgen Buus Lassen, Soborg,
Denmark, assignors to AB Ferrosan, Malmo, Sweden
No Drawing. Continuation-in-part of application Ser. No.
725,134, Apr. 29, 1968, which is a continuation-in-part
of applications Ser. No. 385,058, July 24, 1964, and
Ser. No. 536,293, Mar. 22, 1966, all now abandoned.
This application Oct. 5, 1970, Ser. No. 78,289
Int. Cl. C07d 29/20
U.S. Cl. 260—293.8  2 Claims

ABSTRACT OF THE DISCLOSURE

The invention relates to a basic ketone compound having the formula:

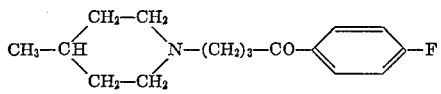

and pharmaceutically acceptable salts thereof. The compound of the invention has valuable pharmaceutical properties.

---

The present patent application is a continuation-in-part of the application Ser. No. 725,134 filed on Apr. 29, 1968, which is a continuation-in-part of the applications Ser. Nos. 385,058 and 536,293, filed on July 24, 1964 and Mar. 22, 1966, resp., all three applications being abandoned.

The present invention relates to a basic ketone compound, viz. 4-fluoro-γ-(4-methylpiperidino) - butyrophenone, having the following structural formula:

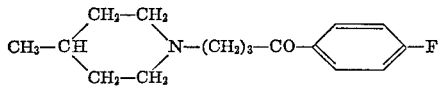

and the pharmaceutically acceptable salts thereof.

The novel compound is a potent central depressant with anti-convulsant and pronounced tranquilizing effects when administered as such or in the form of an acid addition salt such as the hydrochloride. Even in low doses, protection is achieved against convulsions provoked by electric shock, strychnine or metrazole. The new compound also decreases the spontaneous activity of laboratory animals as measured in the jiggle cage, the squirrel wheel and the climbing tests. The toxicity of the new compound is low and its action on the autonomic nervous system is weak. Electro-encephalographic studies on rabbit show that the new compound induces a desynchronization in the cortical electro-encephalogram, which probably is a sign of an increased alertness of the brain. The new compound possesses a prominent analgetic activity as measured in the writhing test; in low doses it blocks the conditioned avoidance response of rats. The new compound has a strong hypothermic activity in laboratory animals.

The compound according to the present invention may be used clinically in the treatment of for instance senile confusion and dementia, schizophrenia, mania and for the treatment of hallucinations caused by brain injuries.

The compound of the present invention is in general less toxic and the effective doses per keg. bodyweight is smaller as compared to similar previously known compounds, such as the substituted amino-ketones disclosed in the French patent specification No. 1,301,863 (Beregi et al.) and the γ-(2-methylpiperidino)-butyrophenone compounds disclosed in J. Am. Chem. Soc., vol. 68, page 2592 (Piperidine Derivatives XVII, Local Anesthetics Derived From Substituted Piperidino-Alcohols, by S. M. McElvain and Thomas P. Carney).

The above-mentioned use of the compound of the invention is only possible since it does not affect the blood pressure which is in contrast to the compound according to the French Medicinal patent No. 1,459 M which differs from the present compound only in that it is unsubstituted in the 4-position of the piperidine ring.

The compound according to the French Medicinal patent No. 1,459 M has found use primarily as a potent drug for the treatment of hypertension or as a tranquilizer, whereas the compound according to the present invention may be used for relieving a wide variety of mental disturbances. It will be obvious that, for a compound to be used for relieving mental disturbances, it will be desired that it does not affect the blood pressure so that it may be used in the required, often massive, doses without any deleterious side effects.

Comparative pharmacological tests have been made for evaluating the properties of the hydrochlorides of the compound according to the present invention and two homologues thereof, viz. the compounds in which the methyl group attached to the piperidino group is in positions 2 and 3 resp., as well as the compound according to the French Medicinal patent No. 1,459 M, viz. the corresponding compound without the methyl group.

The results of the tests are shown in the table below.

Compound I: according to the present invention.
Compound II: the 2-methyl homologue of compound I.
Compound III: the 3-methyl homologue of compound I.
Compound IV: the compound according to the French Medicinal patent No. 1,459 M.

TABLE

| | | | | Mg./kg. | | | | | | |
|---|---|---|---|---|---|---|---|---|---|---|
| | | Potentiation of the barbiturate anaesthesia ESD | Hypothermic effect, ED$_5$° C. | Analgesic activity | | Climbing test, ED$_{50}$ | Squirrel wheel test, ED$_{50}$ | Condition response test, ED$_{50}$ | Amphetamine antagonism, ED$_{50}$ | Apomorphine antagonism, ED50 |
| | LD$_{50}$ | | | Hot plate test, ED$_{50}$ | Writhing test, ED$_{50}$ | | | | | |
| Compound: | | | | | | | | | | |
| I | 330 | 2 | 5 | 4 | 2 | 1 | 2 | 2 | 1 | 6 |
| II | 260 | 13 | 160 | 28 | 10 | 10 | 5 | 20 | ≥40 | >50 |
| III | 380 | 6 | 28 | 10 | 5 | 5 | 5 | 7 | 4 | 11 |
| IV | 230 | 4 | 18 | 14 | 2 | 4 | 3 | 9 | 10 | 19 |

The various tests have been carried out in the following way:

(1) The LD$_{50}$ values have been determined by giving increasing doses of the compounds to mice and the LD$_{50}$ values are mgs. per kg. which kill 50% of the mice.

(2) The potentiation of the barbiturate anaesthesia has been measured in the following way:

Sleeping time, defined as the time during which the animals remained supine, was determined after intravenous injection of hexobarbital 50 mg./kg. The sleeping times of mice, pretreated subcutaneously with varying doses of the test compounds (6 mice/dose) 30 minutes before the hexobarbital injection, were compared with those of untreated controls according to the method of Winter (1948). The sedative dose, ESD, was the dose in mg./kg. which prolonged the sleeping time four times as compared with the controls.

(3) The hypothermic effect has been measured in the following way: The rectal temperature of mice was determined with a thermocouple, readings every 30 minutes. Varying doses of test compound were injected subcutaneously using 6 mice/dose. The experiments, each including 6 experimental and 6 control mice, were carried out at a constant room temperature (22° C.). The $ED_{5° C.}$ was the dose that reduced the body temperature 5° C.

(4) The analgetic hot plate test has been carried out in the following manner: Thermal pain stimuli have been utilized in different studies of analgesic activity. A convenient and rapid screening test is the hot plate method of Woolfe & MacDonald (1944). The test substance was administered subcutaneously in graded doses (6 mice/dose) 30 minutes before placing the animals on an iron plate thermostatically controlled at 55° C. The control mice showed active signs of discomfort, e.g. sitting on their hind legs and licking their front paws. $ED_{50}$ was calculated as the dose in mg./kg. at which 50% of the animals did not show this reaction in 15 seconds.

(5) The analgesic writhing test has been carried out in the following way: Intraperitoneal injection of irritating substances has been show to cause a special syndrome in mice, which may be abolished by analgesics—strong, morphine like ones as well as weaker agents of the antipyretic type (Siegmund et al. 1957, Eckhardt et al. 1958). As irritating substance a diluted solution of acetic acid (15 ml./kg. of a 0.5% solution) was used. In 100% of the control animals this solution provoked a writhing syndrome characterized by intermittent contractions of the abdomen and trunk and stretching of the hind limbs. The test substance was injected subcutaneously in graded doses 20 minutes before the acetic acid (6 mice/dose) and 10 minutes later the animals were observed for the writhing syndrome during 5 minutes. $ED_{50}$ was the dose in mg./kg. at which the writhing syndrome was abolished in 50% of the animals. This test was also employed to ascertain whether the analgesic effect of the tested substance was antagonized by nalorphine (subcutaneously administration to 6 animals per dose) with morphine as reference substance.

(6) The climbing test has been carried out in the following manner: The method was described by Kneip (1960) and Sandberg (1959). Groups of 6 mice were put in a rectangular cage with transparent plastic walls and a net floor. Each cage was provided with a net ladder, which permitted the animals to climb out of the cage, and normally all mice left the cage in a few minutes (high exploring activity in a new environment). The test drugs were administered subcutaneously in graded doses 30 minutes before the animals were put in the cage (one group of 6 mice/dose), and $ED_{50}$ was taken to be the dose in mg./kg. which made 50% of the animals remain in the cage for 10 minutes.

(7) The squirrel wheel test has been carried out in the following manner: A special design of activity wheels, giving the animals free choice to enter the wheels, was used (Ljungberg 1957, Strom 1964). One mouse was put in each cage with a revolving drum 15 minutes after a subcutaneous injection of the substances, and the activity, in drum resolutions during one hour, was recorded. Half the animals were given physiological saline, while the other half received the test substance. After three days the procedure was repeated, but the groups interchanged. Consequently, each animal acted as its own control. Individual quotients of activity and the average values of these quotients were calculated. 12 mice were employed on each dosage, and the activity of the test drugs was recorded as $ED_{50}$, i.e. the dose in mg./kg. by which a 50% decrease of activity was obtained.

(8) The condition response test has been carried out in the following manner: The test was in all essentials performed according to the modification of Jacobsen & Sonne (1955). The apparatus consisted of a rectangular transparent plastic cage, divided into two compartments by a non-transparent wall with a opening through which the animals could move freely. The floor was a grid made of stainless steel rods. By means of two switches an electrice shock could be given through the grid of each compartment. Outside the cage of buzzer was mounted.

Rats were trained to avoid the electric shock (unconditioned stimulus—US) by escaping from one compartment to the other when a buzzer signal (conditioned stimulus—CS) was given. When they responded to the CS a conditioned response (CR) was considered to have been elicited.

The specific blocking action on the CR was tested by administering the test drug subcutaneously in graded doses to 10 rats per dose level. After 2 hours the rats were placed in the cage, and the reaction to CS and US was observed. If the animals failed to escape to the other compartment after CS but reacted to the US, a specific blocking action on the CR was considered to have been obtained. $ED_{50}$ was the dose in mg./kg. at which this occurred in 50% of the animals two hours after the administration of the drug.

(9) The amphetamine antagonism has been measured by determining the quantities of the tested substances necessary for compensating the effect of amphetamine on the central nervous system causing stereotypy as a consequence of the dopamine liberating action of amphetamine. $ED_{50}$ was the dose in mg./kg. at which this stereotypy was abolished in 50% of the animals.

(10) The determination of the apomorphine antagonism has been carried out as described in the article of J. A. Christensen, S. Hernestam, J. B. Lassen and N. Sterner in Acta Pharmacologica et Toxicologica, 1965, vol. 23, pages 109–132.

This test has been used by many for the purpose of correlating structure and neuroleptic potency [P. A. J. Janssen et al. Arzneimittelforschung 9, 765 (1959); ibid 10, 1003 (1960)]. The reason is that we know the site of action of apomorphine in the brain and that all neuroleptics used are known to prevent apomorphine-induced vomiting by acting on the same site, namely on the chemoemetic trigger zone which is a very small receptor located in the area postrema at the floor of the fourth ventricle. When stimulated by apomorphine, the chemoemetic trigger zone will trigger the vomiting centre and hereby the whole emetic process.

The action of a neuroleptic in this test is thought to be as follows: After administration, the neuroleptic drug circulates in the blood stream and a small amount penetrates into the chemoemetic trigger zone via a vascular foot of a reddish fluorescent astrocyte which constitutes the local blood-brain barrier. The drug crosses the cell body of the astrocyte, penetrates into the synaptic cleft of a dopamine-containing adrenergic neurone and forms a monolayer on the surface of the membranes surrounding the synaptic cleft. This surface is rich in GABA-receptors and the neuroleptic drug will complete with GABA for occupying these receptors, thus making them inaccessible for 1-glutamic acid. By thus exerting a GABA-like action, the neuroleptic drug decreases the permeability of the post synaptic membrane surrounding the transmitter-receptor. As a consequence of this action, the access of released transmitter-molecules of dopamine to their receptors is prevented and the nervous transmission process is blocked. When no neuroleptic molecules are present, dopamine is allowed to act as a normal transmitter, it crosses the postsynaptic membrane, reaches its receptor site, transmits the nervous impulse to the vomiting centre and thus triggers the emetic process. With neuroleptic drugs present, this normal triggering process is blocked at the postsynaptic membrane level, dopamine being prevented from reaching its receptor site.

The experiments show that the compound of the present invention has a higher $LD_{50}$ value, it is less toxic than the related compounds except the 3-methyl homologue; further, the $ED_{50}$ values of the present compound are lower than the corresponding values of the related compounds, i.e. the compound according to the invention is more pharmaceutically active, and finally, the therapeutic indices ($LD_{50}/ED_{50}$) are higher for the present compound than for the comparative compounds which diminishes the risk of any toxic effect in the practical use of the compound.

The novel compound or its acid addition salts such as the hydrochloride is usually administered *per os*, for instance in the form of pills or tablets.

For many purposes a suitable clinical does is between 10 and 500 mgs. (calculated as the free base) administered three or four times daily. Naturally, the doses should be adjusted in accordance with the condition, age and weight of the patient.

The invention includes compositions suitable for administration to human beings comprising the new compound of the invention or acid addition salts thereof, especially the hydrochlorides, together with an inert diluent or carrier or dissolved in water for injection. Such compositions may also comprise other active substances.

Tablets may be made by compounding one of the new compounds or an acid addition salt thereof with customary carriers and adjuvants. The following is a suitable tablet formation:

2.5 gms. of the hydrochloride of 4-fluoro-γ-(4-methyl-piperidino)-butyrophenone
9 gms. of potato starch
1 gm. of colloidal silica
2.5 gms. of a 5% aqueous solution of gelatine
2 gms. of talcum
0.2 gms. of magnesium stearate.

This mixture is made up into 100 tablets, each, therefore, containing 25 mgs., of the active component.

The compound of the invention may be prepared by reacting a 4-methyl-piperidine with γ-halogeno-p-fluorobutyrophenone at an elevated temperature and in the presence of an acid binding agent which may be provided by using an excess of the 4-methyl-piperidine, preferably one molecular proportion in excess.

The heating is preferably made in the presence of potassium iodide so as to avoid undesired side reactions. The reaction may be performed in a sealed tube and the reaction medium may be an inert solvent or diluent such as a hydrocarbon e.g. toluene. With the use of a reaction medium the yields are improved and the reaction times are decreased.

The reaction product is recovered from the reaction mixture in a conventional manner, such as by distillation. The acid addition salts are also prepared conventionally, such as by dissolving the base in ether and precipitating it e.g. in the form of the hydrochloride by adding hydrogen chloride.

Suitable pharmaceutically acceptable acids are mineral acids such as hydrochloric acid, sulphuric acid, etc., and organic acids such as succinic acid, maleic acid, malonic acid, palmitic acid, etc.

The following example illustrates the preparation of the compound of the invention.

EXAMPLE

A solution or dispersion consisting of 20.1 gms. (0.1 mole) of γ-chloro-p-fluorobutyrophenone, 19.8 gms. (0.2 mole) of 4-methyl-piperidine and 0.1 gm. of potassium iodide in 150 mls. toluene is heated in a sealed glass tube for 15 hours at 100–110° C. The potassium iodide and the 4-methyl-piperidine hydrochloride formed in the reaction are separated by filtration and the solvent removed from the filtrate by evaporation in vacuum on a steam bath. The residue is distilled and the fraction obtained at 120–125° C. and at a pressure lower than .1 mm. Hg is collected. The base is dissolved in ether and the 4-fluoro-γ-(4-methyl-piperidino)-butyrophenone precipitated as the hydrochloride. The reaction product is purified by recrystallization in ethanol/ether.

Yield 22.0 gms. (73% of theory). Melting point 209–211° C.

| | Analysis, percent | |
|---|---|---|
| | Calculated | Actual |
| Cl | 11.83 | 11.81 |
| N | 4.67 | 4.68 |

What we claim is:
1. A pharmaceutically active basic ketone having the formula:

$$CH_3-CH\begin{array}{c}CH_2-CH_2\\ \\CH_2-CH_2\end{array}N-(CH_2)_3-CO-\langle\rangle-F$$

and its pharmaceutically acceptable salts.
2. The hydrochloride salt of the compound according to claim 1.

References Cited

UNITED STATES PATENTS 1,915,334  6/1933  Salzberg et al. _____ 260—243

FOREIGN PATENTS 1,459 M  8/1962  France _____ 260—293.8

OTHER REFERENCES

Pharmacology and Therapeutics, 6th ed. (1965), pp. 36 and 37, Grollman.

Acta Pharmacol. et toxicol. (1965), 23: 109 and 128, Christensen et al.

HENRY R. JILES, Primary Examiner

S. D. WINTERS, Assistant Examiner

U.S. Cl. X.R.

424—267